US008450410B2

(12) United States Patent
Ceulemans et al.

(10) Patent No.: US 8,450,410 B2
(45) Date of Patent: May 28, 2013

(54) ADHESIVE COMPOSITION FOR THE MANUFACTURING OF CORRUGATED PAPER BOARD

(75) Inventors: Philippe Ceulemans, Turnhout (BE); Olivier Ceulemans, Gierle (BE)

(73) Assignee: Corrutech, Turnhout (BE)

( * ) Notice: Subject to any disclaimer, the term of this patent is extended or adjusted under 35 U.S.C. 154(b) by 0 days.

(21) Appl. No.: 13/204,140

(22) Filed: Aug. 5, 2011

(65) Prior Publication Data
US 2011/0311784 A1   Dec. 22, 2011

Related U.S. Application Data

(62) Division of application No. 10/564,927, filed as application No. PCT/BE2004/000093 on Jun. 25, 2004, now Pat. No. 7,994,252.

(30) Foreign Application Priority Data

Jul. 17, 2003  (BE) ................... 2003/0411

(51) Int. Cl.
*C09B 67/00*  (2006.01)
*B32B 3/28*   (2006.01)

(52) U.S. Cl.
USPC ........................................ 524/502; 428/186

(58) Field of Classification Search
USPC ........................................................ 524/502
See application file for complete search history.

(56) References Cited

U.S. PATENT DOCUMENTS

| 3,728,141 | A |   | 4/1973 | Ray-Chaudhuri et al. |
| 4,404,246 | A |   | 9/1983 | Charbonneau et al. ....... 428/212 |
| 4,424,291 | A |   | 1/1984 | Leake et al. |
| 4,509,949 | A | * | 4/1985 | Huang et al. ...................... 8/558 |
| 4,727,091 | A |   | 2/1988 | Hawrylko ........................ 521/56 |
| 4,824,696 | A |   | 4/1989 | Tokumo et al. |
| 5,322,880 | A |   | 6/1994 | Columbus et al. ............. 524/459 |
| 5,512,618 | A | * | 4/1996 | Duerr .............................. 524/47 |
| 7,431,922 | B2 | * | 10/2008 | Song et al. ................. 424/93.21 |
| 2002/0033116 | A1 |   | 3/2002 | Spencer et al. ............ 106/31.64 |

FOREIGN PATENT DOCUMENTS

| EP | 0310078 |    | 4/1989 |
| EP | 0383214 | A2 | 8/1990 |
| EP | 0629675 | A2 | 12/1994 |

* cited by examiner

*Primary Examiner* — Hui Chin
(74) *Attorney, Agent, or Firm* — Jerold I. Schneider

(57) ABSTRACT

An adhesive composition comprising an amount of an adhesive, and an amount of an additive which is selected from the group of homopolymers of acrylic acid, copolymers of acrylic acid, and polyacrylates, polyurethanes, cellulose thickening agent, natural or synthetic gum, natural or synthetic resin, silica or an inorganic minerals having a layered structure.

47 Claims, 1 Drawing Sheet

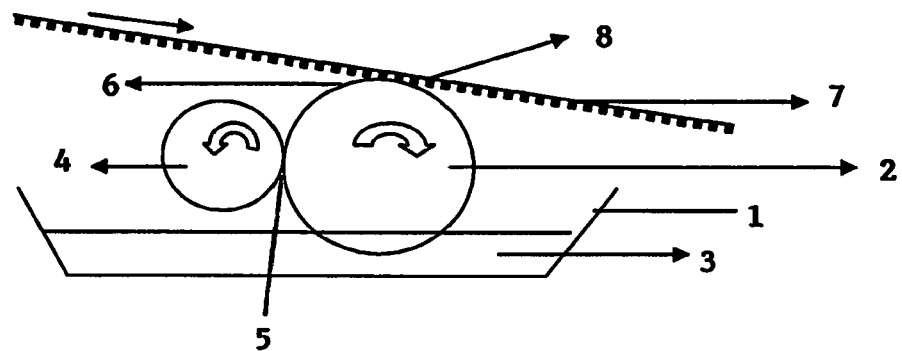

ADHESIVE COMPOSITION FOR THE MANUFACTURING OF CORRUGATED PAPER BOARD

CROSS REFERENCE TO RELATED APPLICATIONS

This application is a division of U.S. patent application Ser. No. 10/564,927, filed 17 Jun. 2006, which was the entity into the U.S. National Stage of International Application No. PCT/BE2004/000093 filed 25 Jun. 2004, which claims priority from Belgian Application No. 2003/0411 filed 17 Jul. 2003, the entireties of each of which is hereby incorporated by reference.

BACKGROUND OF THE INVENTION

The present invention relates to an adhesive composition as disclosed in the preamble of the first claim.

Laminated corrugated board is a multilayer material in which one or both of the top and bottom side of a corrugated cardboard core are adhered to a sheet of flat board or paper. In the manufacturing of corrugated board, often use is made of a starch based adhesive. An adhesive layer is applied to the top of the corrugations, following which the tops of the corrugations are adhered to the paper sheet. Thereby it is important that, depending on whether single faced or double backed cardboard is produced, (i) good adhesion is obtained under application of high, respectively relatively low pressure; (ii) extensive contact, respectively restricted contact is established between the surfaces to be bonded. It is furthermore important that when applying the adhesive, its viscosity is sufficiently low, but that after application the viscosity rapidly increases due to gelatinisation of the starch upon heating.

In this respect, EP-A-1.101.809 discloses that gelatinisation may be promoted through addition of sodium hydroxide and a boron compound, for example boric acid or borax. This is done to solve the problem of providing an adhesive composition with a sufficiently high solids content and a reduced water content, with the aim of minimising deformation of the corrugations and energy consumption for evaporating the water from the card board after the adhesive has been applied. It is disclosed that with starch as the binding agent, the upper limit of the dry solids content is determined by the starch concentration as otherwise insufficient water is present to guarantee good adhesion and the viscosity of the adhesive composition becomes too high. The addition of a water insoluble salt in particular calcium carbonate allows increasing the dry solids content to over 46 wt %. The calcium carbonate is added in a ratio starch:calcium carbonate which is at least between 50:50, preferably between 90:10.

The adhesive composition disclosed in EP-A-1.101.809 however presents the disadvantage that the addition of the filler is expensive and involves clogging of the processing equipment.

FR-A-2784992 discloses an amylaceous adhesive composition for manufacturing corrugated paper board, which contains water, starch and an amount of two groups of active agents. The active agents serve the purpose of increasing the viscosity of the adhesive composition and of improving the wettability properties. The first active agent is a biodegradable soap, the second active agent is a sequestering agent for complexing alkaline earth metal ions such as calcium, magnesium, iron and others. Suitable sequestering agents include polycarboxylic acids and/or phosphonic acid and/or polyamylc acid, and or nitrilotriacetic acid or their alkaline salts and/or alkaline phosphates and mixtures thereof. The sequestering agent has the function of solubilising any fatty acids remaining in the soap.

Paper board produced using the adhesive composition disclosed in FR-A-2784992 however presents the disadvantage that it shows a high risk to deformation and weakening of the paper board structure, clue to increased penetration of the adhesive into the paper. Water has been found to cause deformation of both the corrugated paper and the flat liners.

SUMMARY OF THE INVENTION

There is thus a need to an adhesive composition with which the risk to deformation of the paper may be reduced.

It is the object of the present invention to provide an adhesive composition with which the risk to deformation of the corrugations of the card/paper board may be further reduced.

This is achieved according to the present invention with the technical features of the characterising portion of the first claim.

When analysing the problems occurring with the manufacturing of paper or card board, the inventor proposed to use an adhesive with a decreased penetration ability into the paper/card board, rather than an increased penetration ability as is taught by the prior art. In his opinion, decreasing adhesive penetration into the paper should allow saving on the amount of adhesive applied, limit the amount of water contacting the paper/card board and in that way limit the amount of water penetrating the paper/card board.

The inventor has now found that a reduced card/paper penetration ability may be obtained with an adhesive which at the time of application has a lower viscosity than the known adhesive composition. The inventor thereby envisaged that with the reduced viscosity of the adhesive at the time of application, a smaller amount and a thinner layer of adhesive could be applied to the corrugations. With a thinner layer applied, the amount of water contacting and penetrating the paper/card board is reduced, thus reducing energy requirements for evaporating water that in the course of the lamination process had penetrated the corrugated paper board. The reduced water penetration also minimises the risk to deformation of the corrugated paper/card as well as of the flat liners. When further analysing the problems occurring with the manufacturing of paper or card board, the inventor concluded that the viscosity of the adhesive composition after application should be sufficiently high to ensure good adhesion.

To meet both requirements of a sufficiently low viscosity at the time of application of the adhesive and a sufficiently high viscosity at the time of effectuating the adhesion of the corrugated layer and the flat liner, the inventor proposed to add to the adhesive composition an additive as disclosed in the characterising portion of the first claim. The claimed additives show pseudo plastic properties and are capable of imparting this pseudo plastic behaviour to the adhesive composition containing them, even when present in a low concentration in the adhesive composition only. By incorporating the claimed additives, an adhesive composition can be obtained whose viscosity changes depending on the shear forces that are applied to it. In particular, the adhesive composition containing the additive of the present invention has the effect that It shows a reduced viscosity when applied to the corrugated paper/card, so that the amount applied may be minimised. The inventor has namely found that an adhesive composition containing the claimed additive shows the effect that its viscosity decreases when subjected to shear forces.

as soon as the adhesive composition has been applied to the corrugations, an almost instantaneous increase in the viscosity of the adhesive takes place, which prevents the adhesive from flowing away and ensures good adhesion. In this respect the inventor has found that initial viscosity of the additive is restored virtually immediately upon removal of the shear forces, as a consequence of which penetration of the adhesive into the card/paper board is minimised. The reduced adhesive penetration reduces water penetration into the paper/card board. This has the consequence that energy requirements for evaporating the penetrated water may be minimised, that a paper/card board with an improved strength may be obtained and that the tendency to lasting of the paper board may be reduced thus putting the paper board available for further processing after a shorter drying time. On the other hand, the viscosity is such that sufficient water penetration is ensured to minimise the risk to the formation of cracks in the paper/card board.

The inventor has further observed that with the claimed additives the viscosity of the adhesive composition may be reversibly increased and decreased. This had the advantage that any adhesive which has not be transferred from the applicator to the cardboard surface but remained on the applicator, may be recycled and re-used without this adversely affecting the adhesive strength. The inventor has further observed that the adhesive composition shows a better affinity for the card/paper board and provides an improved adhesion as well as improved printability of the surface as compared to prior art adhesive compositions. Prior art adhesive compositions used to control the viscosity of the adhesive composition by controlling the gelling temperature. However, gelling is an irreversible process and once gelled, the adhesive composition cannot be re-used and looses its adhesive properties. With the present invention, the viscosity of the adhesive composition may be controlled independently of the gelling process. The presence of the additive hardly affects the gelling properties of the composition.

The claimed additives have been found to show pseudo plastic behaviour and to impart this property to the adhesive composition containing them, even in case they are present in small amounts of for example 0.001-5 wt. % or 0.001-1 wt. % only. As only a small amount is needed, the nature of the adhesive composition remains virtually unaffected, as well as its solids content and gelling properties, which is important when processing the composition.

The above described effects are particularly pronounced with an additive which is a homopolymer of acrylic acid, in particular a homopolymer of an α, β unsaturated monocarboxylic acrylic acid having 3-5 carbon atoms, which corresponds to formula I:

  formula I wherein R Is a substituent selected from the group of H, monovalent alkyl, aryl or alkylaryl radicals and monovalent cyclo alkyl radicals, although H as a substituent is preferred. Nevertheless, R may also be selected from the group of alkyl, alkoxy, haloalkyl, cyanoalkyl and similar groups containing 1 to 9 carbon atoms.

The above described effects have also been observed with an additive which is a copolymer, in which the acrylic acid of formula I is co-polymerised with at least one alkyl acrylate of formula II:

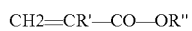  formula II.

In which R' is selected from the group of H, methyl, ethyl and R" is a C10-C30 alkyl group, preferably a C10-C20 alkyl group, the copolymers being cross-linked with a cross-linking agent which is a polyfunctional vinylidene monomer containing at least two terminal methylene CH2=C groups as has been described above.

Representative acrylates of formula II include methylacrylate, ethylacrylate, propylacrylate, butylacrylate, methylmethacrylate, methylethacrylate, octylacrylate, laurylacrylate, stearylacrylate, behenyl acrylate, and the corresponding methacrylates. Suitable copolymers include copolymers of a mixtures of two or more of the afore mentioned compounds with the acrylic acid of formula I. Other comonomers include acrylic nitriles,—olefinically unsaturated nitriles preferably those having 3-10 carbon atoms, for example acrylonitrile and methacrylonitrile; monoolefinically unsaturated acrylic amides, for example acrylamide and methacrylamide; N-alkylolamides of α, β-olefinically unsaturated carboxylic acids including those having 4-10 carbon atoms, preferably N-methylolmethacrylamide.

Homopolymers of acrylic acid and methacrylic acid are preferred, because of their superior properties.

An optimum viscosity ratio between a first situation in which shear forces are applied to the composition and a second situation in which shear forces are removed, is obtained with an additive in which the homopolymers or copolymers are cross-linked with a cross-linking agent which is a polyfunctional alkylalkylene or a polyfunctional alkylalkylidene monomer containing at least two terminal methylene CH2=C groups, and having a molecular weight of between 0.05-100, preferably between 0.5 and 10, more preferably between 1-5 billion Dalton, the additive showing the property that upon application of shear forces, the viscosity decreases, the viscosity increasing instantly as the shear forces are removed.

Preferably use is made of a cross-linking agent which is a polyfunctional vinylidene monomer, more preferred a polyalkenyl polyether, in particular an allylpentaerythritol. Other suitable cross-linking agents include polyfunctional vinylidene monomers containing at least two terminal CH2=C groups, for example butadiene, isoprene, divinylbenzene, divinyl naphthalene, allyl acrylates, and the like. Preferred cross-linking agents are those containing an alkenyl group in which an olefinic double bond is attached to a terminal methylene group. Particularly preferred cross-linking agents include polyethers which contain on average two or more alkenyl ether groups per molecule. Other suitable cross-linking monomers include diallyl esters, dimethylallyl ethers, allyl or methallyl acrylates, acrylamides. Examples of those are allyl pentaerythritol, allyl sucrose, trimethylolpropane triacrylate, 1,6-hexanediol diacrylate, trimethylolpropane propane diallyl ether, pentaerythritol triacrylate and the like.

The adhesive composition of this invention presents the advantage of showing an increased cohesion, as a consequence of which the risk to cracking of the adhesive layer, once applied, may be reduced. The adhesive composition of this invention is particularly suitable for the manufacturing of the more recently developed corrugated paper/card boards, where there is an increasing tendency to reduce the width of the corrugations and increase the number of corrugations. In the recently developed corrugated boards, the corrugations may have a height of between 0.6 and 6.5 mm, the strength of the corrugations decreasing with increasing height. The adhesive composition of this invention is further particularly suitable for the manufacturing of the more luxurious, coated paper, which is usually coated with a coating agent that hampers evaporation of water. As with the present invention water penetration is reduced, the amount of water that needs to be evaporated is also reduced and the risk to formation of steam bubbles when evaporating the water is minimized, even when used with coating agents showing a low water penetration.

Suitable commercially available products for use as the additive in the adhesive composition of this invention are available from Sigma Chemical Company, Rohm & Haas for example Acusol®, Noveon for example Carbopol®, from Wako Pure Chemical Industries of Japan, or from Allied Colloids of Great Britain for example Salcare®.

The additive which is incorporated into the adhesive composition of this invention will mostly be water soluble. It can be mixed as such with an adhesive composition in the solid state, or it may be added to an aqueous adhesive composition. To facilitate mixing, the additive is preferably diluted with a solid product before being added to the adhesive formulation. Suitable diluting agents are for example starch or inert inorganic oxides, for example siliciumdioxide, aluminium oxide, magnesium oxide, or mixed oxides of two or more of those. In that case the additive is mixed with the diluting agent before being added to the adhesive composition. The additive can be mixed in the form of a solid composition with a solid starch composition, or can be added to a liquid starch composition as a liquid composition. The use of starch as a diluting agent for the additive assists in minimizing the risk to the formation of lumps upon mixing with the remainder of the adhesive composition.

In a preferred embodiment of this invention, the adhesive composition contains the additive in a small amount which will mostly be at least approximately 0.001 wt. %, preferably at least 0.05 wt. % with respect to the total weight of the composition. The maximum amount of additive included will mostly be less than 5 wt. %, preferably less than 1 wt. %, more preferably between less than 0.5 wt % with respect to the total weight of the adhesive composition. These concentrations suffice to achieve the desired effect that the viscosity decreases to a desired extent when shear forces are applied to the composition, the viscosity restoring virtually immediately as pressure is removed.

Because of the low amount of additive needed, (i) the solids content of the adhesive composition of this invention remains virtually unaffected, which is important when processing the composition in terms of minimising the risk to the occurrence of clogging of the process equipment; (ii) there is no need to leave out or modify any other ingredient of the adhesive composition to compensate for any property that might have changed in an undesirable manner; (iii) the need to re-consider the nature and concentration of the components present in the adhesive composition, to compensate for the additive, can be dispensed with as well as the need to partially or fully remove one or more compounds of the adhesive composition.

The above described additive is suitable for use with a large variety of adhesive compositions, the nature of the adhesive composition not being critical to the invention. Suitable examples include adhesive compositions based on a polysaccharide adhesive, in particular a starch based adhesive although cellulose, or starch originating from peas, rice and potatoes are considered suitable as well. Thereby the starch may be a modified starch or the usual non-modified starch. The additive of the present invention is however also suitable for use with a polyvinylacetate based adhesive composition, although starch based adhesive compositions are preferred. Examples of suitable starch based adhesive compositions include so-called Stein-Hall adhesives, in which starch is present in both gelatinised and non-gelatinised from. A typical Stein-Hall adhesive for the manufacturing of corrugated board contains about 80 wt. % of water, about 15 wt. % of non-gelatinised starch, about 3 wt. % of gelatinised starch, about 0.55 wt. % of sodium hydroxide and about 0.4 wt. % of borax decahydrate although the weight ratios in which the different components are present, may vary. To this composition preferably about 0.1 wt. % of the additive is added.

Other suitable starch based adhesive compositions for use with the present invention contain 0.5-50 parts by weight of starch, between 0.01-2.5 parts by weight of alkalihydroxide, between 0.01-2 parts by weight of borax, 80-150 parts of water and 0.0008-10.25 parts of the additive. The gelatinised starch acts as the carrier and is an effective dispersing agent for the non-gelatinised starch. The non-gelatinised starch is caused to gelatinise on the warm paper surface, which involves a rapidly increasing viscosity. Similar examples of the above described adhesive formulation are the so-called no-carrier, Pristine and Minocar adhesives in which all the starch is in a swollen, but the non-gelatinised state, The starch may however also be at least partly pre-gelatinised or swollen. The inventors have now found that with the adhesive composition of this invention the use of a carrier material can be dispensed with which permits economizing on the starch. Thus, the amount of starch used in the adhesive composition may be reduced with at least 2.5 wt. % with respect to the total weight of the composition. often even 4 or 5 wt %. This embodiment presents the further advantage that a single phase adhesive composition is provided in stead of a two phase adhesive composition.

Furthermore The starch used in the adhesive composition of this invention is selected from the generally commercially available starches, for example rice, wheat, corn, potato, tapioca or pea starch. The starch may be used in its natural form, or it may be physically, chemically or enzymatically modified. Physically modified starch is generally available in the form of roll-dried or extruded starch.

The adhesive composition may further contain an optical brightening agent, to allow controlling the quality of the adhesive composition using UV irradiation.

An adhesive composition of this invention can be prepared by mixing 500 parts of primary water with 60 parts by weight of primary starch, to obtain a primary starch mixture. The mixture is stirred for 1 to 15 minutes. Thereafter, to the thus obtained mixture 1.8 parts of a polyacrylate homopolymer additive cross-linked with an allylpentaerythritol is added, as well as 15 parts by weight of sodium hydroxide, 600 parts by weight of water, 450 parts by weight of starch and 11 parts by weight of borax. Thereafter, the mixture is stirred again for 1-15 minutes.

In another example, approximately 850 parts by weight of water are mixed with 3 parts of a polyacrylate homopolymer additive cross-linked with an allylpentaerythritol and the mixture is mixed. Thereafter, about 56 parts of corn starch are added and the mixture is heated to 40° C. Caustic soda is added in a concentration of 32% and an amount of approximately 16 parts in dry weight and the mixture is mixed again. Thereafter, about 950 parts of water are added, about 550 parts of starch and 13 parts of borax. The mixture is stirred for 10 minutes.

In another embodiment, the polyacrylate homopolymer cross-linked with an allylpentaerythritol is first diluted with starch and an optical brightening agent in a weight ratio of 75-125, preferably 90-95 parts by weight of starch, 0.5-10, preferably 1-5 parts of optical brightening agent and 1-10, preferably 4-9 parts of polyacrylate. This mixture is then added to the above described adhesive composition in the above described ratio of between 0.001-5 wt % of additive with respect to the total weight of the composition.

The present invention also relates to a solid pre-mix which contains the adhesive composition of this invention as described above. The solid premix contains about 20-80, preferably 40-60 parts of gelatinised starch, about 5-50, preferably 10-30 parts of alkali, preferably caustic soda, about 200-750, preferably 350-550 parts of starch powder, about 1-25, preferably 5-15 parts of borax, and about 0.01-5, preferably 0.5-2.5 parts of the additive of the present invention described above. However, if so desired the use of gelatinised starch may be dispensed with if so desired as is disclosed above.

The adhesive can than be prepared by adding an amount of water to an amount of the premix.

The premix may be prepared by mixing the above described ingredients in the given amounts. The premix may for example be prepared by mixing 40-60 parts of starch with 400-600 parts of water, about 10-20 parts of alkali, preferably caustic soda, about 350-550 parts of starch powder, about 5-15 parts of borax, heating the mixture to gelatine the starch. Thereafter, the water is evaporated to obtain a dry powder. To that powder about 0.5-2.5 parts of the additive of the present invention are added. The thus obtained premix needs only be mixed with a sufficient amount of water, for example about 500-700 parts of water to obtain the desired adhesive composition.

The present invention also relates to a process for the production of laminated corrugated paper or card board comprising a plurality of super imposed layers of corrugated paper or card connected together by intermittent flat sheets of paper, which process is characterised in that an amount of the above described adhesive composition is applied to the top of the corrugations, where after the layers are adhered to each other under pressure.

The present invention also relates to a process for the production of compact paper or card board comprising a plurality of super imposed layers of paper or card, which process is characterised in that an amount of the above described adhesive composition is applied to the layers, where after the layers are adhered to each other under pressure.

The present invention further relates to a laminar paper or card board comprising a plurality of super imposed layers of corrugated paper or card connected together by interinittent flat sheets of paper, which are adhered to each other by means of the above described adhesive composition.

The present invention further relates to a compact paper or card board comprising a plurality of super imposed layers of paper or card, which are adhered to each other by means of the above described adhesive composition.

The adhesive composition of this invention is also suitable for the manufacturing of laminated paper/card board, honeycomb paper/card board and multi-layer paper/card board comprising a plurality of layers of corrugated paper or card, each layer being adhered to a bottom and/or top layer of a flat liner.

The present invention further relates to the use of the above described adhesive composition in the manufacturing of paper, according to which an amount of the adhesive composition is added to the paper pulp in the course of the paper production process.

BRIEF DESCRIPTION OF THE DRAWING

Further preferred embodiments of the present invention are disclosed in the appending dependent claims and are illustrated in the appending FIG. 1,

DETAILED DESCRIPTION

A device for producing corrugated card board is shown in FIG. 1. The adhesive is contained in a glue tray 1 in which an applicator 2, this is a cylinder with a large diameter is rotated. Upon rotation, adhesive 3 is entrained with the surface of the applicator 2. The viscosity of the adhesive composition 3 is affected somewhat, as rotation of the applicator 2 induces shear forces to the adhesive composition. A doctor roll 4 is positioned at a small distance from the applicator 2, which corresponds to the glue gap 5. The position of the doctor roll 4 determines the thickness of the glue gap 5, i.e. the thickness of the adhesive layer 6 that is entrained with the cylinder and applied to the corrugated paper/card. By accelerating the doctor roll 4 with respect to the applicator 2, the adhesive composition is subjected to an additional shear force as a consequence of which the viscosity of the adhesive on the applicator is further decreased. As the tops of the cormgated paper/card 7 contact the applicator 2, a ship of adhesive 8 is applied to each corrugation. Because of the low viscosity the strip will have a small thickness only. As soon as the adhesive formulation contacts a con'ugation, the distance between the adhesive 8 and the doctor roll 4 increases, shear forces are removed and the viscosity of the adhesive increases almost instantly, thus reducing the risk to flowing away of the adhesive or penetration of the adhesive into the paper/board and ensuring good adhesion. Thereafter, when heating the adhesive coated paper/card board to a temperature of about 50-65° C., gelling of the adhesive composition takes place.

The reduced viscosity entails the advantage that a smaller amount of adhesive can be applied, without this adversely affecting the quality of the corrugated paper board, which is an important economical consideration. As a consequence of the virtually instant restoration of the viscosity as soon as shear forces are removed, any adhesive remaining on the applicator, shows a reduced risk to splashing. Thus, waste of the adhesive composition may be reduced, which is an important economical advantage.

The person skilled in the art will be capable of selecting the appropriate rotation speed of each of the applicator and doctor roll, and of adjusting the acceleration of the applicator and doctor roll with respect to each other and with respect to the paper, to achieve optimum viscosity and optimum viscosity decrease.

We claim:

1. An adhesive composition comprising an amount of an adhesive and an amount of an additive, wherein the additive comprises at least one homopolymer of an α,β-unsaturated monocarboxylic acrylic acid having 3-5 carbon atoms, which corresponds to formula I:

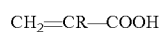

$$CH_2=CR-COOH \qquad \text{formula I}$$

wherein R is a substituent selected from the group of H, monovalent alkyl, aryl, alkylaryl radicals, monovalent cyclo alkyl radicals, alkoxy, haloalkyl, cyanoalkyl containing 1 to 9 carbon atoms, whereby the at least one homopolymer is cross-linked with a cross-linking agent which is a polyfunctional vinylidene monomer containing at least two terminal methylene $CH_2=C$ groups, whereby the term vinylidene is meaning the $CH_2=C$ groups which are present in butadiene, isoprene, divinylbenzene, divinyl naphthalene and in allyl acrylates.

2. The adhesive composition as claimed in claim 1, wherein the at least one homopolymer has a molecular weight of between 0.05-100 billion Dalton.

3. The adhesive composition as claimed in claim 2, wherein the at least one homopolymer has a molecular weight of between 0.5-10 billion Dalton.

4. The adhesive composition as claimed in claim 3, wherein the at least one homopolymer has a molecular weight of between 1-5 billion Dalton.

5. The adhesive composition as claimed in claim 1, wherein the at least one homopolymer is a polymer of acrylic acid or methacrylic acid.

6. The adhesive composition as claimed in claim 1, wherein the cross-linking agent is a polyalkenyl polyether.

7. The adhesive composition as claimed in claim 6, wherein the cross-linking agent is an allylpentaerythritol.

8. The adhesive composition as claimed in claim 1, wherein the adhesive composition is a pseudo plastic material.

9. The adhesive composition as claimed in claim 1, wherein the adhesive composition is based on starch, cellulose, pea originating cellulose or a polyvinylacetate adhesive composition or a mixture of two or more of these.

10. The adhesive composition as claimed in claim 1, wherein the composition contains at least 0.001 wt. % and less than 5 wt. % of the at least one additive with respect to the total weight of the adhesive composition.

11. The adhesive composition as claimed in claim 10, which contains at least 0.05 wt. % and less than 1 wt. % of the at least one additive with respect to the total weight of the adhesive composition.

12. The adhesive composition as claimed in claim 1, wherein the composition contains between 0.5-50 parts by weight of starch, between 0.01-2.5 parts by weight of alkalihydroxide, between 0.01-2 parts by weight of borax and between 80-150 parts by weight of water.

13. A process for producing the adhesive composition as claimed in claim 1, wherein the at least one additive is first diluted with starch, cellulose or a polyvinylacetate adhesive in a weight ratio of 75-100 parts by weight of starch, and 0.5-10 parts of polyacrylate, and thereafter mixed with the adhesive composition.

14. The process of claim 13, wherein 1-5 parts of optical clarification agent is added to the adhesive composition.

15. A process for the production of laminated corrugated paper or card board, comprising a plurality of superimposed layers of corrugated paper or card connected together by intermittent flat sheets of paper, wherein an amount of the adhesive composition according to claim 1 is applied to the top of the corrugations, where after the layers are adhered to each other under pressure.

16. Paper board or card board comprising a plurality of superimposed layers of corrugated paper or card connected together by intermittent flat sheets of paper, wherein the layers are adhered to each other by means of the adhesive composition as claimed in claim 1.

17. A compact paper or card board comprising a plurality of superimposed layers of paper or card, which are adhered to each other by means of the adhesive composition as claimed in claim 1.

18. Paper comprising an amount of the adhesive composition as claimed in claim 1.

19. A process for the production of compact paper or card board comprising a plurality of superimposed layers of paper or card, wherein an amount of the adhesive composition as claimed in claim 1 is applied to the layers, where after the layers are adhered to each other under pressure.

20. A solid premix which contains about 5-50 parts of alkali, about 200-750 parts of starch powder, about 0.01-5 parts of the at least one additive as claimed in claim 1.

21. The solid premix of claim 20, further containing about 20-80 parts of gelatinised starch.

22. The solid premix of claim 20, further containing 1-25 parts of a buffer.

23. The solid premix of claim 22, wherein borax is used as the buffer.

24. An adhesive composition comprising an amount of an adhesive and an amount of an additive, wherein the additive comprises at least one copolymer of an α,β-unsaturated monocarboxylic acrylic acid having 3-5 carbon atoms, which corresponds to formula I:

$$CH_2=CR-COOH \qquad \text{formula I}$$

wherein R is a substituent selected from the group of H, monovalent alkyl, aryl, alkylaryl radicals, monovalent cyclo alkyl radicals, alkoxy, haloalkyl, cyanoalkyl containing 1 to 9 carbon atoms,
with at least one alkyl acrylate represented by formula II $$CH_2=CR'-CO-OR'' \qquad \text{formula II}$$

in which R' is selected from the group of H, methyl, ethyl and with an additive where R'' is a $C_{10}$-$C_{30}$ alkyl group, wherein the at least one copolymer is cross-linked with a cross-linking agent which is a polyfunctional vinylidene monomer containing at least two terminal methylene $CH_2=C$ groups, whereby the term vinylidene is meaning the $CH_2=C$ groups which are present in butadiene, isoprene, divinylbenzene, divinyl naphthalene and in allyl acrylates.

25. The adhesive composition as claimed in claim 24, wherein the at least one comopolymer has a molecular weight of between 0.05-100 billion Dalton.

26. The adhesive composition as claimed in claim 25, wherein the at least one comopolymer has a molecular weight of between 0.5-10 billion Dalton.

27. The adhesive composition as claimed in claim 26, wherein the at least one comopolymer has a molecular weight of between 1-5 billion Dalton.

28. The adhesive composition as claimed in claim 24, wherein the at least one comopolymer is a polymer of acrylic acid or methacrylic acid.

29. The adhesive composition as claimed in claim 24, whereby in formula II, R'' is a $C_{10}$-$C_{20}$ alkyl group.

30. The adhesive composition as claimed in claim 24, wherein the cross-linking agent is a polyalkenyl polyether.

31. The adhesive composition as claimed in claim 30, wherein the cross-linking agent is an allylpentaerythritol.

32. The adhesive composition as claimed in claim 24, wherein the adhesive composition is a pseudo plastic material.

33. The adhesive composition as claimed in claim 24, wherein the adhesive composition is based on starch, cellulose, pea originating cellulose or a polyvinylacetate adhesive composition or a mixture of two or more of these.

34. The adhesive composition as claimed in claim 24, wherein the composition contains at least 0.001 wt. % and less than 5 wt. % of the at least one additive with respect to the total weight of the adhesive composition.

35. The adhesive composition as claimed in claim 34, which contains at least 0.05 wt. % and less than 1 wt. % of the at least one additive with respect to the total weight of the adhesive composition.

36. The adhesive composition as claimed in claim 24, wherein the composition contains between 0.5-50 parts by weight of starch, between 0.01-2.5 parts by weight of alkalihydroxide, between 0.01-2 parts by weight of borax and between 80-150 parts by weight of water.

37. A process for producing the adhesive composition as claimed in claim 24, wherein the at least one additive is first diluted with starch, cellulose or a polyvinylacetate adhesive in a weight ratio of 75-100 parts by weight of starch, and 0.5-10 parts of polyacrylate, and thereafter mixed with the adhesive composition.

38. The process of claim 37, wherein 1-5 parts of optical clarification agent is added to the adhesive composition.

39. The process for the production of laminated corrugated paper or card board, comprising a plurality of superimposed layers of corrugated paper or card connected together by intermittent flat sheets of paper, wherein an amount of the adhesive composition according to claim 24 is applied to the top of the corrugations, where after the layers are adhered to each other under pressure.

40. Paper board or card board comprising a plurality of superimposed layers of corrugated paper or card connected together by intermittent flat sheets of paper, wherein the layers are adhered to each other by means of the adhesive composition as claimed in claim 24.

41. A compact paper or card board comprising a plurality of superimposed layers of paper or card, which are adhered to each other by means of the adhesive composition as claimed in claim 24.

42. Paper comprising an amount of the adhesive composition as claimed in claim 24.

43. A process for the production of compact paper or card board comprising a plurality of superimposed layers of paper or card, wherein an amount of the adhesive composition as claimed in claim 24 is applied to the layers, where after the layers are adhered to each other under pressure.

44. A solid premix which contains about 5-50 parts of alkali, about 200-750 parts of starch powder, about 0.01-5 parts of the at least one additive as claimed in claim 24.

45. The solid premix of claim 44, further containing about 20-80 parts of gelatinised starch.

46. The solid premix of claim 44, further containing 1-25 parts of a buffer.

47. The solid premix of claim 46, wherein borax is used as the buffer.

\* \* \* \* \*